US011985227B2

(12) United States Patent
Misztal et al.

(10) Patent No.: US 11,985,227 B2
(45) Date of Patent: May 14, 2024

(54) METHOD AND A SYSTEM FOR SECURING DATA, ESPECIALLY DATA OF BIOTECHNOLOGICAL LABORATORIES

(71) Applicant: DICELLA SP. Z O.O., Cracow (PL)

(72) Inventors: Krzysztof Misztal, Cracow (PL); Aleksandra Kubica-Misztal, Cracow (PL); Tomasz Sluzalec, Czestochowa (PL)

(73) Assignee: DICELLA SP. Z O.O., Cracow (PL)

( * ) Notice: Subject to any disclaimer, the term of this patent is extended or adjusted under 35 U.S.C. 154(b) by 0 days.

(21) Appl. No.: 17/797,811

(22) PCT Filed: Nov. 16, 2020

(86) PCT No.: PCT/EP2020/082248
§ 371 (c)(1),
(2) Date: Aug. 5, 2022

(87) PCT Pub. No.: WO2022/022844
PCT Pub. Date: Feb. 3, 2022

(65) Prior Publication Data
US 2023/0141331 A1 May 11, 2023

(30) Foreign Application Priority Data

Jul. 29, 2020 (PL) .......................................... 434845

(51) Int. Cl.
*H04L 9/06* (2006.01)
*G06F 21/64* (2013.01)
(52) U.S. Cl.
CPC ............ *H04L 9/0643* (2013.01); *G06F 21/64* (2013.01)
(58) Field of Classification Search
CPC ... H04L 9/0643; H04L 9/0825; H04L 9/3236; H04L 9/3247; H04L 9/3297; G06F 21/64
See application file for complete search history.

(56) References Cited

U.S. PATENT DOCUMENTS 10,637,665 B1 * 4/2020 Sundaresan ........... H04L 63/083
11,093,643 B2 * 8/2021 Hennebert .......... G06F 16/2379
(Continued)

FOREIGN PATENT DOCUMENTS

CN   111222880 A    6/2020
WO   2017044554 A1  3/2017
(Continued)

OTHER PUBLICATIONS

Secure Hash Standard. Federal Information Processing Standard, National Institute of Standards and Technology, (FIPS), 180-4, Mar. 6, 2012.
(Continued)

*Primary Examiner* — Oleg Korsak
(74) *Attorney, Agent, or Firm* — Dickinson Wright PLLC; Andrew D. Dorisio (57) ABSTRACT

A method and system for securing data of biotechnological laboratories using blockchain technology, including a central server and two or more subsystems controlled by a dedicated sub-server. Each of the two or more subsystems includes: a first blockchain database for storing information data, a second blockchain database for storing access data, wherein users having access to the first database are able to allow or forbid another user to read from the first database the data authored by them by adding the digital key of said another user with information of corresponding permissions to the second database. Every authorized user having access to the first database is able to revoke from another user previously granted access to data in the first database, and said method for securing data includes verification by the central server of compatibility and immutability of blockchain databases in said two or more subsystems.

9 Claims, 3 Drawing Sheets

(56) References Cited

U.S. PATENT DOCUMENTS

| | | | |
|---|---|---|---|
| 2017/0364637 A1 | 12/2017 | Kshepakaran et al. | |
| 2019/0205563 A1* | 7/2019 | Gonzales, Jr. | H04L 9/3247 |
| 2019/0279210 A1* | 9/2019 | Pen | H04L 9/3239 |
| 2019/0294822 A1* | 9/2019 | Hennebert | G06F 21/602 |
| 2020/0076572 A1* | 3/2020 | Irazabal | G06F 21/602 |
| 2020/0218795 A1* | 7/2020 | Antar | H04L 9/0643 |
| 2020/0251213 A1* | 8/2020 | Tran | G06N 20/00 |
| 2020/0304289 A1* | 9/2020 | Androulaki | G06F 21/6245 |
| 2020/0320211 A1* | 10/2020 | Moore | H04L 9/0643 |
| 2020/0382280 A1* | 12/2020 | Jayachandran | G06Q 20/382 |
| 2020/0412521 A1* | 12/2020 | Shi | G06Q 20/308 |
| 2021/0012586 A1* | 1/2021 | Dutta | G07C 9/00857 |
| 2021/0218745 A1* | 7/2021 | Firnkorn | H04L 63/123 |

FOREIGN PATENT DOCUMENTS

| | | | |
|---|---|---|---|
| WO | 2019195821 A1 | 10/2019 | |
| WO | 2019228560 A2 | 12/2019 | |
| WO | 2020073112 A1 | 4/2020 | |
| WO | 2020106803 A1 | 5/2020 | |

OTHER PUBLICATIONS

Angraal, Suveen; Krumholz, Harlan M.; Schulz:, Wade L.: Blockchain Technology Applications in Health Care Circulation: Cardiovascular Quality and Outcomes 10(9), e003800 (2017).

Dworkin, Morris J.: SHA-3 Standard: Permutation-Based Hash and Extendable-Output Functions. Federal Information Processing Standards Publication (NIST FIPS)-202, Aug. 4, 2015.

Gallagher, Patrick: Digital Signature Standard (DSS). Federal Information Processing Standards Publications, vol. FIPS pp. 186-3, Jul. 19, 2013.

Nakamoto, Satoshi: Bitcoin: A Peer-to-Peer Electronic Cash System, (2019).

Schneier, Bruce: The NSA is Breaking Most Encryption on the Internet. Blog Post, Sep. 5, 2013.

Stevens, Marc, Bursztein, Elie, Karpman, Pierre, Alberini Ange, Markov, Yarik, Bianco, Alex Petit, Baisse, Clement: Announcing the First Sha1 Collision. Google Security Blog, Feb. 23, 2017.

Zyskins, Guy, Nathan, Oz, et al.: Decentralizing Privacy: Using Blockchain to Protect Personal Data: 2015 IEEE CS Security and Privacy Workshops. pp. 180-184. IEEE (2015).

* cited by examiner

METHOD AND A SYSTEM FOR SECURING DATA, ESPECIALLY DATA OF BIOTECHNOLOGICAL LABORATORIES

TECHNICAL FIELD

The invention is related to a method for securing data, especially data of biotechnological laboratories and a system for implementing this method.

BACKGROUND

Blockchain

In 2008, Satoshi Nakamoto published a paper [5] describing bitcoin, which is now referred to as the first cryptocurrency in the world. The prefix crypto is derived from the word cryptography. The bitcoin is a complete and complex system which provides the ability to perform anonymous and cashless transactions over the Internet. Bitcoin is based on a decentralized settlement book, which can be managed by any of the system's users. Such users are called miners, because their reward for the management is the newly mined currency. The miners gather information about transactions and validate whether they can be performed. Then they choose the transactions to store in the settlement book. This book is known as a blockchain. Thanks to the used cryptography algorithms, it is impossible to make any transaction as another user. Moreover, if a transaction is stored in the blockchain, no one can change or delete it.

It is worth noticing that while all bitcoin transactions are stored in the blockchain unencrypted, it is also possible to keep encrypted data in the blockchain.

Bitcoin Technology

There are several implementations of blockchain and we will focus on the well known precursor bitcoin. For more information the reader is referred to [2]. The sellers or payers who want to make a transaction must submit their action to blockchain. Everyone that is connected to the blockchain system receives the information about the transaction. Receivers are called miners and are the clients, which validate the action by algorithm. The validation by cryptographic algorithm is carried out with two computation steps. Miners provide the computation power. Software for mining is free and simple. Moreover no certification is required, so everyone can volunteer with their computers. A miner must validate existence of the bitcoin and that it can be used for transaction. Then the miner checks the form and accepts the transaction. If the miner validates the whole block—the miner is rewarded with a bitcoin. The block has the detailed information about validation processes of transactions. The block is stored in the blockchain after it is validated by a fixed number of miners. What is more, within every block there are timestamps and mathematically generated complex variable sums called hashes that secure the (un)interruption in data block. These cryptographic hashes of blocks are calculated based on the preceding and the current block. This distinct and unique sum makes up the security signature that combine blocks into blockchain. The irreversibility of hash code makes blockchain immutable. This way we obtain digital trust. Decentralized validation of actions and saving them to the history makes mediator entity like banks useless to perform transaction.

Example:
1. John wishes to pay bitcoins to Alice.
2. John's transaction is made.
3. Transactions are combined into a new block.
4. Blocks are broadcasted to miners.
5. Miners validate and accept the transactions.
6. New block is encrypted with hash of the previous block.
7. New block becomes a part of blockchain.
8. Alice receives bitcoins.

Sensitive Data in Blockchain

Decentralized system can be widely used. The greatest benefit is that there is no need of third parties. As we have seen before, the decentralized data may be secured and immutable. Nowadays, most organizations collect our personal data in order to optimize their services. They want to predict our needs and create our digital personal image thus personal information in every aspect is a valuable resource in today economy. Although there are many benefits to a personalized system, the concern for our privacy is doubtful. What is more, now more often organizations have little control over the personal and sensitive data. That is why this information should not be handled by third-parties. The centralized system is vulnerable to hacker attacks, as well as phishing. The solution is for the user to own and be responsible for providing its information.

Figure 1:
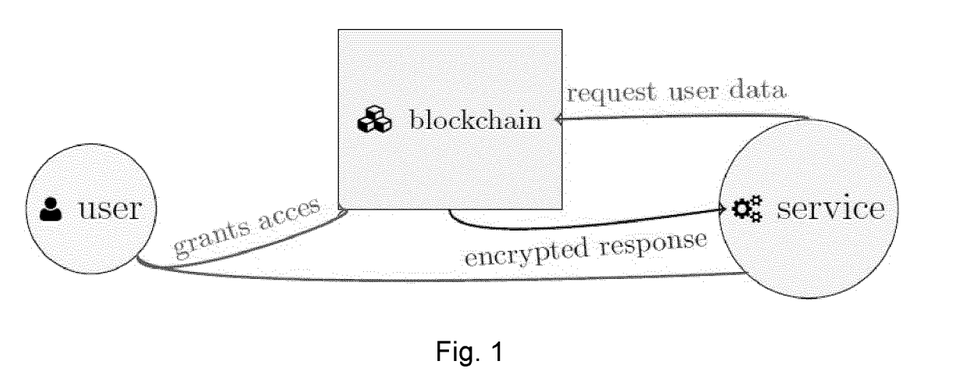
FIG. 1 presents simplified schema of the above grant-access data blockchain.
Figure 2:
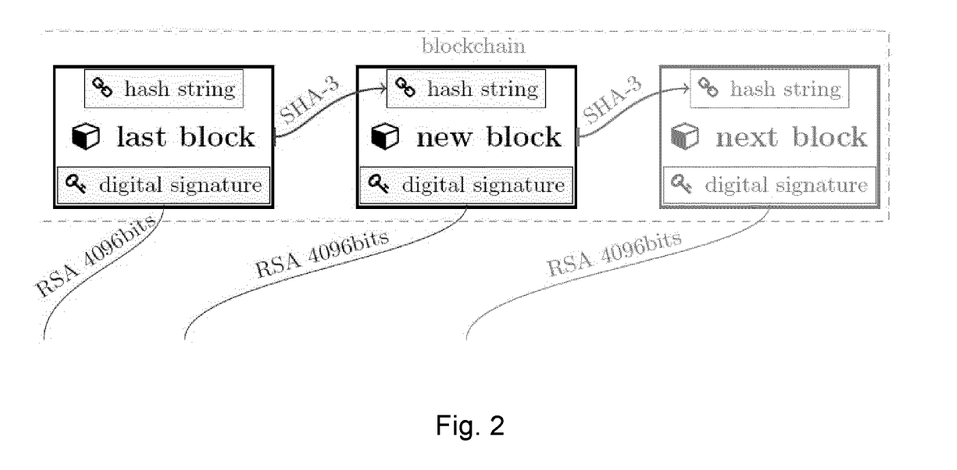
FIG. 2 shows hash linking and RSA signature in blocks.

We can do this by applying blockchain storage solution proposed by [8]. Authors proposed personal data management system that has advantages of blockchain and off-blockchain storage. This requires several key aspects: data ownership, data transparency audibility and fine-grained access control. The proposed platform distinguishes between users, who own and control their personal information, and services. Every user has information about collocated data and how it is accessed by organization. Services have delegated permissions from users to access their data. What is more, the owner of the data is able to make changes to the set of permissions to deny the access to data to a service. This solution is similar to that of mobile apps. It will not have an impact on the user-interface because the access-control policies are stored in a blockchain. Only users are able to make changes in the blockchain (FIG. 1).

Some ideas about blockchain application in health care can be seen in [2].

Laboratory

The results obtained in *Good Manufacturing Practice,* GMP and *Good Laboratory Practice,* GLP laboratories have to be reliable. Any modification of partial results can make the final result fail. It is the reason why the lab records have to be collected precisely and without any forgery. It is also important to remember the author of every record. The authorship has to be beyond any doubt, which means that nobody can create a record on behalf of another user and no user can deny his own authorship of any of his records. Moreover, the documentation has to be immutable, so that no stored data can be modified or deleted. These requirements make users keep exact records, which objectively increases the reliability of the laboratory.

Solving this problem required the inventors to cooperate with the employees of biotechnological laboratories and diagnostics. It required a great amount of time to translate the real life problem to algorithmic technological approach.

There were several key aspects for lab employees:
constant access to warehouse—with restriction and access rules,
rules of processing the production—to improve the process,
rules of gathering lab results—the authorship of obtained data,
rules of reporting everyday work—to avoid forgery and falsification,
communication with clients.

All these aspects have a significant impact on the lab workflow.

The blockchain technology is widely used in accounting and banking, but not exclusively in those fields. There are many projects adapting this technology in many different areas of daily lives. Our project, by using blockchain technology in the widely understood area of healthcare, is among them.

The requirements for the documentation in biotechnological labs cannot be enforced when records are being kept on paper. However, relevant requirements for lab records are satisfied by the main features of blockchain. The present patent application proposes an innovative method and system for securing data of biotechnological laboratories using blockchain technology—by which data is stored in a blockchain and correctness of newly added transactions is checked.

Publication US20170364637A1 entitled "Mobile health management database, targeted educational assistance (tea) engine, selective health care data sharing, family tree graphical user interface, and health journal social network wall feed, computer-implemented system, method and computer program product" discloses a system, method and computer program product of capturing and displaying health information of a first person on an electronic computing device, in which the electronic computing device can include: one or more computer processors; and one or more memory devices, the computer-implemented method can include, e.g., a) receiving data electronically about a first person user on the first client computing device, where the first person user has one or more family member users, each having one or more computing devices, or a user with which the user may wish to share a personal health data record, the data about the first person user can include: any identification data, any inputted health related data, or any captured health related data about the first person, can include: any health related data; an application programming interface (API) accessible data; or other health records such as, e.g., electronic medical record (EMR); scanned data; sensed data; or optical character recognition (OCR) captured data; b) receiving data about one or more second person users, where the at least one second person user can include: any other person user with which the first person wishes to be connected, a family member, a guardian, a friend, an individual, or care provider, the data about the second person users can include: any identification data, any inputted health related data, or any captured health related data about the second person user(s); and c) sharing at least a portion of the data electronically about the first person user, to the second person user(s). Various other embodiments can include various features such as a health journal, targeted educational content, an interactive family tree, selectable sharing, escalated alerting, notifications, and collaborative digital file cabinet. This document is focused on a mobile application rather than technical details of how data is stored. In particular, this document does not disclose or suggest a system comprising a central server and two or more blockchain subsystems, each of them controlled by a dedicated sub-server, in which the central server verifies compatibility and immutability of blockchain databases in said two or more subsystems.

SUMMARY

It is thus the object of the present invention to provide a method and a system for securing data, especially data of biotechnological laboratories, using blockchain technology, providing safety and credibility of data (as each piece of data would have its author), while providing at the same time easy to manage scheme of data access and control to users. Moreover, the invention provides a system and a method fully compliant with relevant provisions of law.

According to the invention, a method for securing data, especially data of biotechnological laboratories, using blockchain technology, realized in a system comprising a central server and two or more subsystems, each of them controlled by a dedicated sub-server, wherein each of the two or more subsystems comprises:
a first blockchain database for storing information data, especially data of biotechnological laboratories, wherein transactions in the first blockchain database are committed according to blockchain rules, including treating a first specific piece of information as a transaction, creating a digital signature of the transaction by the author of said first specific piece of information with the author's digital key, combining transactions into a first new block, encrypting the first new block with a hash of the previous block in the first database and storing the first new block in the first database,
a second blockchain database for storing access data, including digital keys of users having access to the first database and information about permissions to read data from or write data to the first database by each such user associated with the digital key of this user, in which second database information is stored according to blockchain rules, including treating a second specific piece of information as a transaction, creating a digital signature of the transaction by the author of said second specific piece of information with the author's digital key, combining transactions into a second new block, encrypting the second new block with a hash of the previous block in the second database and storing the second new block in the second database,
wherein every authorized user having access to the first database is able to allow another user to read from the first database the data authored by said authorized user by adding the digital key of said another user with information of corresponding permission to said second database,
wherein every authorized user having access to the first database is able to forbid another user to read from the first database the data authored by said authorized user by adding the digital key of said another user with information of corresponding permission to said second database,
wherein every authorized user having access to the first database is able to revoke from another user previously granted rights regarding access to data in the first database authored by said authorized user,
wherein said method for securing data includes verification by the central server of compatibility and immutability of blockchain databases in said two or more subsystems by:

collecting hashes and optionally timestamps from blockchain databases said two or more subsystems, preferably by collecting only said hashes and optionally timestamps, exchanging new transactions between the central server and the sub-servers exchange and independently verifying compatibility of hashes, with the use of the private key of the sub-server to avoid fake hashes.

Preferably, the SHA-3 is used as the hash function for calculation of block hashes in the first blockchain database and/or the second blockchain database.

Preferably, the RSA algorithm with a key size of 4096 bits is used for creating a digital signature of the transaction with its author's digital key in the first blockchain database and/or the second blockchain database.

Preferably, the system additionally comprises a timestamp server and the timestamp server provides timestamps to the first blockchain database and/or the second blockchain database, especially to transactions and/or blocks in the first blockchain database and/or the second blockchain database.

Preferably, the second database comprises a summary block, containing hashes of the K preceding blocks and the hash of the latest summary block, wherein summary block contains updated information of user privileges.

In such case, the central server supervises the summary blocks.

Preferably, central server periodically communicates with the sub-servers, in particular blockchain databases in each of the two or more subsystems, each of them controlled by a dedicated sub-server, are periodically verified by the central sever.

The inventive method may be running on a laboratory sever or a central computer without internet access.

Preferably, said first blockchain database and said second blockchain database is one and the same blockchain database, for storing both the information data, especially data of biotechnological laboratories, and the access data, including digital keys of users having access to the first database and information about permissions to read data from or write data to the first database by each such user associated with the digital key of this user.

Preferably, the data stored in the first database relate to donor registration for transplants, biostorage or clinical trials.

According to the invention, a system for securing data, especially data of biotechnological laboratories, comprising a central server and two or more subsystems, each of them controlled by a dedicated sub-server, wherein each of the two or more subsystems comprises a first blockchain database for storing information data, especially data of biotechnological laboratories and a second blockchain database for storing access data, including digital keys of users having access to the first database and information about permissions to read data from or write data to the first database by each such user associated with the digital key of this user, said system configured and programmed for carrying out the aforesaid inventive method.

Existing blockchain adaptation systems are wide and decentralized. Generally in such systems all of the miners hold a part or the whole blockchain database and perform validation. These decentralized copies of transactions make them immune for hacking attacks or forgery, because it is impossible in practice to organize sufficient amount of computational power ("hacking force")—as almost all nodes of blockchain needed to be falsified.

In a laboratory scenario it is impossible to achieve that amount of computational power to verify transactions. But there is no need for that. Laboratory results are not that much into aim of unwanted attacks. There is a need to prevent the results from being falsified or corrupted by an unentitled person. There is a need to track changes in data. Laboratory computers are mostly in closed networks, without access to internet, and they are not open as public service.

In order to achieve a similar level of protection as in a decentralized blockchain—we can simulate decentralization by making the a semi-decentralized system. This idea requires one or more sub-servers, which perform regular blockchain maintenance in their respective blockchain sub-systems, and a central server, which is a guard for the blockchain sub-systems. The central server contains (only) hashes and timestamps from the blockchain sub-systems. Moreover, at fixed intervals the central server validates the sub-servers by computing their blockchains. In this scenario the central server acts as an additional miner, which simulates holding the whole blockchain.

The semi-decentralized approach as described above has several advantages, including:

less computational power comparing to a fully decentralized blockchain;

possibility of easy adaptation to variety of laboratories without additional equipment—due to the idea of a compact network;

soft copy of blockchains held by the central server;

each of the sub-servers holding only their own respective data in a respective blockchain sub-system;

In case of a forgery attack at least two servers must be hacked. The system can be implemented and can run in closed a network without internet access.

BRIEF DESCRIPTION OF THE DRAWINGS

Preferred embodiments of the present invention are presented below in a more detailed way with reference to the attached drawings, in which.

DETAILED DESCRIPTION

Preferred embodiments of the invention are described in details below. The examples serve only as an illustration and do not limit the scope of the present invention.

Blockchain Application

The author of bitcoin, [5], stated that there can be a central authority which produces coins and validates transactions. It brings up the problem that the authority would have infinite knowledge regarding every transaction. This problem can be solved in a very tricky way. Before we attempt to explain the solution to this let us focus on transaction that we define in blockchain for GMP and GLP laboratories. We want every data information to be unmodified and has its author. In our platform the transaction of a single information represents a coin in bitcoin system.

Let us consider a scenario in which user A has created a note about some topic. Our system needs to remember the authorship of that note as well as the fact that user A cannot deny any part of that note. That is why the user certifies the note by his digital signature. The different B user stated that the note has faulty so he want to make a correction. He can do this but not in the obvious way. User B takes the note, adds the calculated hash code from that note, add a correction to the note. After adding his digital signature he submits the information. In this way every user can validate which part is A's and which is B's. We see a compatibility between bitcoin, crypto-coin and a data note according to the invention. The correction mechanism made by B is similar to case of spending same crypto-coin twice. We observe that a system which verifies folding signatures would solve this problem, same as in bitcoin scenario.

A different aspect is when a need to create information arises. Coins can be made in a specific regularized way. The information stored in our platform should be available for every authorized user. That is why we need a second type of coin that would represent the permission access for users. That is why every authorized laboratory user would have the ability to add a digital key of his coworker allowing him to make transitions in the blockchain. As well as every authorized user it the same way can deny specific user to access the system. To sum up, in the bitcoin system the information about from whom to whom the coin is sent is stored. In the inventive platform we store the information about:

users digital keys with permission information—we track if the user is allowed to sign a transaction, data information—we track authorship of laboratory data; this solution is general, so that any type of lab data can be stored.

Therefore, in the inventive solution, both data and credentials are collected in a blockchain databases. From this point of view the inventive system may be considered as composed of two parts.

Technological Details

Programming language and libraries: We choose specific cryptographic packages and programming language Python3, so that we can crate application for any system (in any technology). Although python apps are not as efficient as those in C language, but they are more portable. Python is also valued between professional programmers who work with cyber-security. In the prototype we used Django framework and cryptography python package because of the SHA-3 implemented hash function. It allows to simple and effective programming and is extending rapidly. These algorithms are sufficient to our needs.

Block hash function: The base and essential ingredient for the blockchain is a well-defined hash function. The National Institute of Standards and Technology (NIST) published two documents [1] and [3], where they certified only three hash functions: SHA-1, SHA-2 and SHA-3.

The SHA-3 is technologically completely different from the other two. The SHA-1 and SHA-2 are based on a common mathematical mechanism. In 2017 Google announced [7] that SHA-1 is broken and should not be used for security. In comparison to SHA-1 and SHA-2, we chose SHA-3 as a new and free of bugs algorithm.

User digital signature: Next important step in creating the blockchain is the algorithm for digital signatures and its validation. Here, the key solution is an asymmetric one-way cryptographic function. The National Institute of Standards and Technology (NIST) in [4] have defined three cryptographic algorithms that used digital signatures: RSA, DSA and ECDSA.

Due to the controversy with elliptic curves proposed by cryptographic authority Bruce Schneier [6] we chose the RSA algorithm with a key size of 4096 bits.

Blocks implementation details: To avoid the future problems we designed the blocks in the form of dictionary with a predefined set of keys. Those objects can be easily serialized and deserialized to the JSON format.

---

Listing 1.1 shows seven keys for dictionary-blocks.
class BlockField (Enum):
   BLOCK_TYPE = 0
   TIMESTAMP = 1
   AUTHOR = 2
   SIGNATURE = 3
   OBJECT = 4
   PREVIOUS_HASH = 5
   NONCE = 6
   Listing 1.1. Enum describing all parameters in block object.
We also defined five types of blocks shown at listing 1.2.
class BlockType (Enum):
   GENESIS = 0
   INSERT_BLOCK = 1
   UPDATE_BLOCK = 2
   INSERT_KEY = 3
   REVOKE_KEY = 4
   Listing 1.2. Enum describing possible types of blocks in the chain.

---

The genesis block is a first one in the chain: There can be only one genesis block in the blockchain. It contains the system administrator key and it cannot be rejected. Public key is controlled by admins managing the software, not in the hands of laboratory employees.

Platform

Figure 3:
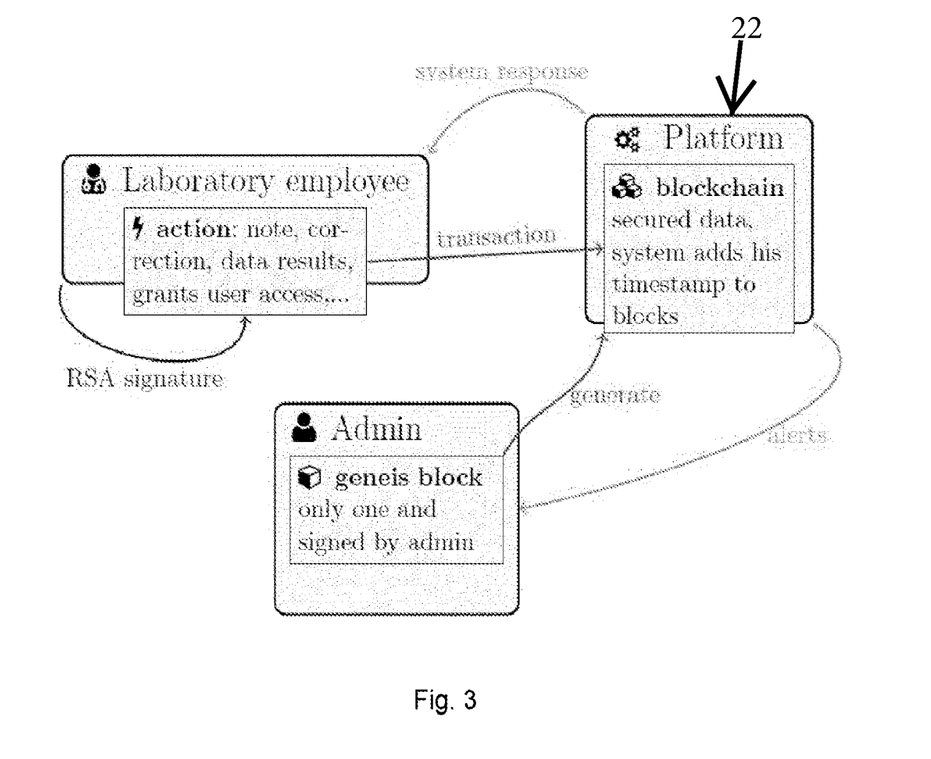
FIG. 3 presents proposed laboratory blockchain platform usage; the platform is validating and storing signed and secured transactions; additional lab-supporting algorithms perform analyses for users basing on the blockchain data; alerts are sent when needed.

We have ended the work of implementation of blockchain technology prototype, moreover, we have made an unconventional modification of blockchain technology in the way that is adapted to the objectives given by our theoretical analysis. We validated time resources that were saved by our system. There was a significant improvement. System was effective to time-consuming and resource-consuming problems. The designed platform was verified in laboratory conditions. We observed that the designed solution had an impact on the laboratory workflow (FIG. 3).

We have confirmed the effectiveness in every aspect of the use cases, as well as in the performance of our system. The processing time and memory usage by blockchain mechanism were not computationally demanding.

Our designed template platform with small customization provides benefits that are widely desired in the laboratories. Below is the list of advantages that comes from proposed blockchain system.

1. Data are secured against unauthorized changes.
2. Blockchain security of data makes them authentic and repudiation.
3. Data stored in blockchain are transparent.
4. Due to legal regulations of Good Manufacturing Practice—Code of Federal Regulations, Title 11, part 11 (GMP CFR 21 part 11) system allows to electronic documentation conducting.

5. System conforms to legal requirements for biobanks.
6. System helps realization of tissue and cell procurement in agreement with doctor's and dentist's laws.
7. System fulfills the acts of pharmaceutical laws in terms of production of advanced medicinal products.
8. System satisfies UE requirements regarding production and medical therapy (transplanting cells, tissue and organs).
9. Additional algorithms in the system archive the statistics improving the lab workflow.
10. System helps in stable managing laboratory storages.
11. System built-in analytical algorithms save time of employees—because they list demands verification, production.

System Stability

The author in [5] introduce the timestamp server idea, which binds blocks chronologically. In our proposed system there is only one timestamp server. The network or physical access to the server is limited to minimum. The system checks the data created or edited in a laboratory as well as keys of users who can submit this data. The timestamp server sorts transactions in the chronological order. When a new piece of data is added—the system is validating its propriety, for example:
    if the note was made before,
    if the edited content of the note corresponds to the last one in the blockchain,
    if a user is allowed to add a note—system verifies if the user's digital key is active and permitted to add a content.

We have made a stability list to determine if the blockchain is corrupted. Below is the checklist that is validated by the system when inserting a block to the blockchain:
1. the fist block is not a genesis block,
2. more than one block is genesis block,
3. previous hash field for genesis block is different than expected,
4. the timestamp from the name of block is not corresponding to the content of block,
5. previous hash value of the block is not compatible with its previous block,
6. hash string does not begin with fixed length of zeros,
7. user digital key is added twice,
8. user digital key is deleted twice,
9. genesis key is deleted,
10. block added by unauthorized user—due to no digital key,
11. block added by unauthorized user—due to digital key rejection,
12. lack of mandatory field(s) in the block.

We tried to hack our system. We used brute-force attacks, but luckily without any success. The cryptographic packages the we have chosen in the carrying out of our system are dedicated to this kind of unwanted hacking access. Moreover the SHA-3 algorithm, used as the hash function, is one of the safest, most secure and most efficient hash algorithms. In the case of non-quantum computers, the SHA-3 algorithm should not be broken within the next 20-30 years.

Semi-Decentralized Blockchain

Figure 4:
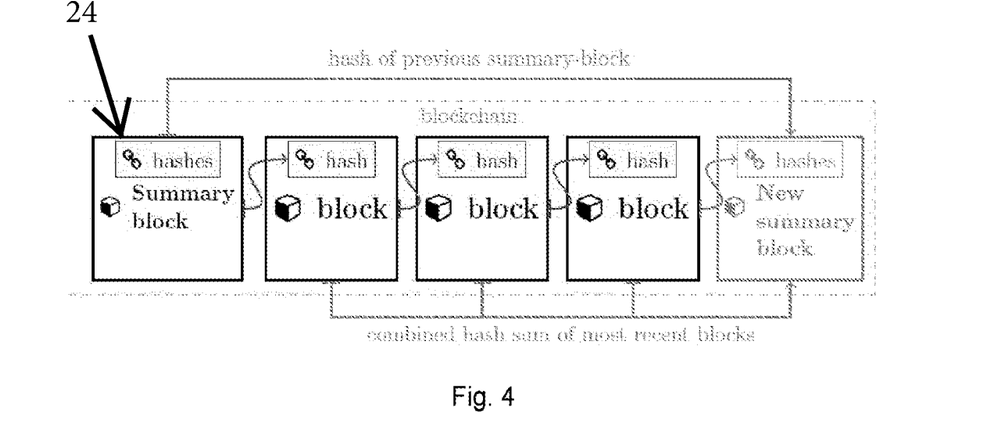
FIG. 4 shows a summary block, containing hashes of the K previous blocks and the hash of the latest summary-block; summary block contains updated information of user privileges; summary-block is a checkpoint block, there is no need to calculate "tail" of blockchain.
Figure 5:
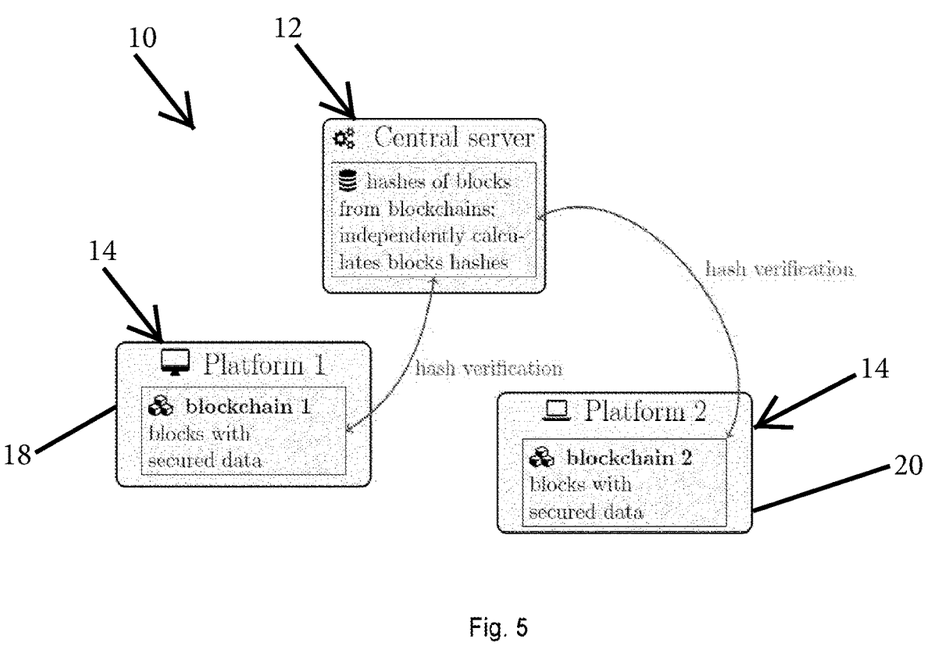
FIG. 5. presents a central server, controlling two or more blockchain systems, storing hashes and timestamps of all blocks and periodically verifying blockchains if they are corrupted.

There is no need to divide blockchain into parts or keep entire blockchain in every instance. That is why in a large facility with many separate laboratories it is beneficial to introduce a semi-decentralized blockchain. We use one central server that contains only hashes of blocks form laboratories blockchains and verifies if they are corrupted.
    In multi-laboratory scenario there is a need for a central authority which verifies operations in laboratories.
    Semi-decentralized blockchain is a must in multi-laboratory situation to increase transparency between laboratory units (FIG. 4).
    There is only one central server in the semi-decentralized blockchain scenario.
    The central server verifies the compatibility and immutability of blockchains in sub-laboratories, wherein each of the blockchains in the sub-laboratories is controlled by a dedicated sub-server.
    The central server collects only hashes and timestamps from blockchains of sub-laboratories.
    The central server and sub-servers exchange new transactions and independently verify compatibility of hashes. Private key of the sub-server is needed to avoid fake hashes.
    Whole sub-servers' blockchains are periodically verified by the central sever.
    The central server supervises the summary blocks (if summary blocks are used).
    The central server periodically communicates with the sub-laboratories. Schedule is defined by admin (FIG. 5).

Platform Adaptation

The following features are optional but useful features of the present invention, which can be used as a schedule algorithm by a superuser/admin and may be adapted to a particular laboratory situation.
    One single computer can contain and manage simple blockchain without additional improvements.
    Laboratory results are mostly excel and paper form. Due to user friendly interface, the inventive platform increases workflow.
    Media constancy—only hashes of media files are kept in blockchain.
    Blockchains can be semi-decentralized.
    Blockchain can be running on a laboratory sever or a central computer without internet access.
    Periodically whole blockchain is calculated and checked for incompatibility.
    Summary block generation can be activated to achieve lower computation time.
    In facility with sub-laboratories blockchain is semi-decentralized. Central server is judge caretaker, that periodically collects and verifies only hashes of blocks form blockchain of dependent sub-laboratories.
    In maintenance no blockchain changes are allowed.

Gensisblock

Genesisblock Technical Details:
1. All user information are in blockchain.
2. In UserData field there are private user keys encrypted with their passwords.
3. There is only one superuser admin.
4. Only admin is permitted to create genesis block.
5. There is only one genesis block that starts the blockchain.

Users Permissions

Users Technical Details:
Genesisblock is mandatory to start blockchain and create new user.
User permission and private keys information are checked every time.
To secure unauthorized accessing, permissions are stored in blockchain similar to admin and genesisblock scenario.
Only superusers can add a new authorized user.
Only superusers can revoke permission(s) from user.
All actual user privileges are stored in summary block.

Summary-Block

Except from specific computational research units, there might be lack of high-end computers in some laboratories. That is why we introduced summary-block idea. This simple addition is a perfect solution to shorten computation time while still not breaking blockchain basis.
1. Summary-block is a shortcut-block that shorten blockchain.
2. Summary-block purpose is to improve computation time for new transactions.
3. Blocks computation times are analyzed. If computation time is above critical value, the admin is informed.
4. Only superuser admin can force manually the summary-block.
5. Summary-block generation conditions:
   New user is added.
   User privileges are changed
   Algorithm constraint—current blocks size is too big.
   Computation time is too long.
   Maintenance constraint.
6. Summary-block generation:
   (a) Blockchain is dived into K blocks. Every K blocks there is a summary-block.
   (b) Entire blockchain is calculated and verified for corruption by using only summary-blocks and remaining most recent blocks.
   (c) New summary-block contain hashes of:
      previous block
      previous summary-block
      recent blocks (starting from previous summary-block)
   (d) Current blockchain is back-upped and replaced with summary-block as the last block.
   (e) Classical entire blockchain verification is scheduled.
   (f) Genesis-block remain the same.

The platform (comprising the inventive method and the inventive system) as described above has been applied is selected fields related to biotechnological laboratories. Examples of such applications are described below.

Electronic Donor Registration for Transplants

The inventive platform was applied to deliver a web application for registering tissue donating patients in a laboratory and preparation of proper documentation. The system allows also to complete all necessary data for tissue donor registration, to make decision if the patient may be allowed to donate and to register of performed tests and related observations thereto. Thanks to the system it is easy to coordinate the work of the whole team.

The system is operated in three steps:
1. Registration of a patient in the system together with the next applications: personal data, type of tissue to be collected or research program to which the collection is to be covered.
2. Downloadable qualification of consent form for continuing the procedures is filled in, which must be printed and signed by the patient. Then, the remaining elements of the qualification data are filled in, which include, among others, the results of laboratory tests and past diseases. This data is verified and a decision is made whether the patient should be allowed to tissue collection.
3. Tissue collection is carried out in the case of a positive qualification. After the tissue collection in the laboratory, the collection data are entered into the system and its number is generated. There is possibility to print the protocol and send the collected tissue to one of the cooperating entities.

Biostorage

The inventive platform was applied to deliver a web application for managing materials stored in the warehouse of pharmaceutical manufacturers, cytostatics laboratories and other reception drugs prepared in pharmacies, tissue and cells, banks laboratories in GMP and GLP standards. The system allows to define the requirements for each item stored in the warehouse by preparing material specifications. Thanks to this, the application guides you step by step through the process of releasing the material to the warehouse, storage, issue as well as ordering the missing materials. The unique feature of the system is the management and documentation of intermediate materials, which are prepared from starting materials in your unit.

The system is operated in five steps:
1. Define a list of materials stored in the warehouse. For each of them, specify a list of suppliers from which the material can be ordered. For each material, develop a quality specification and record template for taking of such material.
2. Take the material for storage. Document it compatibility of the received material with its specification by generating a record and history of the supplier. Print the label, stick it on the released material and place it in the correct location on the storage area.
3. Check the stock. Set warning limits for materials in the warehouse the system will inform you about materials whose expiry date is nearing the end! Generate the order before you are surprised by too short expiry date.
4. Be ready to produce! Define a list of materials that you need to produce/process your product/transplant. One-click check if you're ready for a new order!
5. Manage material consumption. Materials stored in the warehouse can be assigned to specific products/transplants that are the essence of your business. Thanks to this, you will learn about the use of materials and easily analyze costs in terms of product type/transplant, duration of the process, amount of the received product and employees.

The present disclosure is further defined in the following clauses:

Clause 1. A method for securing data, especially data of biotechnological laboratories, using blockchain technology, realized in a system 10 comprising a central server 12 and two or more subsystems 14, each of them controlled by a dedicated sub-server, wherein each of the two or more subsystems comprises:
- a first blockchain database 18 for storing information data, especially data of biotechnological laboratories, wherein transactions in the first blockchain database are committed according to blockchain rules, including treating a first specific piece of information as a transaction, creating a digital signature of the transaction by the author of said first specific piece of information with the author's digital key, combining transactions into a first new block, encrypting the first new block with a hash of the previous block in the first database and storing the first new block in the first database,
- a second blockchain database 20 for storing access data, including digital keys of users having access to the first database and information about permissions to read data from or write data to the first database by each such user associated with the digital key of this user, in which second database information is stored according to blockchain rules, including treating a second specific piece of information as a transaction, creating a digital signature of the transaction by the author of said second specific piece of information with the author's digital key, combining transactions into a second new block, encrypting the second new block with a hash of the previous block in the second database and storing the second new block in the second database,
- wherein every authorized user having access to the first database is able to allow another user to read from the first database the data authored by said authorized user by adding the digital key of said another user with information of corresponding permission to said second database,
- wherein every authorized user having access to the first database is able to forbid another user to read from the first database the data authored by said authorized user by adding the digital key of said another user with information of corresponding permission to said second database,
- wherein every authorized user having access to the first database is able to revoke from another user previously granted rights regarding access to data in the first database authored by said authorized user, wherein said method for securing data includes verification by the central server of compatibility and immutability of blockchain databases in said two or more subsystems by:
- collecting hashes and optionally timestamps from blockchain databases said two or more subsystems, preferably by collecting only said hashes and optionally timestamps,
- exchanging new transactions between the central server and the sub-servers exchange and independently verifying compatibility of hashes, with the use of the private key of the sub-server to avoid fake hashes.

Clause 2. The method according to clause 1, wherein the SHA-3 is used as the hash function for calculation of block hashes in the first blockchain database and/or the second blockchain database.

Clause 3. The method according to clause 1, wherein the RSA algorithm with a key size of 4096 bits is used for creating a digital signature of the transaction with its author's digital key in the first blockchain database and/or the second blockchain database.

Clause 4. The method according to clause 1, wherein the system additionally comprises a timestamp server and the timestamp server 22 provides timestamps to the first blockchain database and/or the second blockchain database, especially to transactions and/or blocks in the first blockchain database and/or the second blockchain database.

Clause 5. The method according to clause 1, wherein the second database comprises a summary block 24, containing hashes of the K preceding blocks and the hash of the latest summary block, wherein summary block contains updated information of user privileges.

Clause 6. The method according to clause 5, wherein the central server supervises the summary blocks.

Clause 7. The method according to clause 1, wherein the central server periodically communicates with the sub-servers, in particular blockchain databases in each of the two or more subsystems, each of them controlled by 1 dedicated sub-server, are periodically verified by the central sever.

Clause 8. The method according to clause 1, running on a laboratory sever or a central computer without internet access.

Clause 9. The method according to clause 1, wherein said first blockchain database and said second blockchain database is one and the same blockchain database, for storing both the information data, especially data of biotechnological laboratories, and the access data, including digital keys of users having access to the first database and information about permissions to read data from or write data to the first database by each such user associated with the digital key of this user.

Clause 10. The method according to clause 1, wherein the data stored in the first database relate to donor registration for transplants, biostorage or clinical trials.

Clause 11. A system for securing data, especially data of biotechnological laboratories, comprising a central server and two or more subsystems, each of them controlled by a dedicated sub-server, wherein each of the two or more subsystems comprises a first blockchain database for storing information data, especially data of biotechnological laboratories and a second blockchain database for storing access data, including digital keys of users having access to the first database and information about permissions to read data from or write data to the first database by each such user associated with the digital key of this user, said system configured and programmed for carrying out the method according to clause 1.

Clinical Trials

The inventive platform was applied to deliver a web application used to create and manage CRF (Case Report Form) in non-commercial clinical trials. The application is designed for both Sponsor Research/CRO (Clinical Research Organization) and for the research team. As a sponsor of the study (and/or CRO) you will quickly create a CRF for a new clinical trial, you will be able to track the progress of clinical trials and make monitoring visits. As a research team, you'll be able to easily fill the CRF of trial participants.

Acknowledgement

This work was supported by the Regional Operational Programme for the Małopolska Region 2014-2020 as research project: Development of an innovative data security system in biotechnology and diagnostic laboratories based on blockchain technology. Contract number: RPMP.01.02.01-12-0183/18-00.

REFERENCES

1. Secure hash standard. Federal Information Processing Standard (FIPS) 180-4 (2012)

2. Angraal, S., Krumholz, H. M., Schulz, W. L.: Blockchain technology: applications in health care. Circulation: Cardiovascular Quality and Outcomes 10(9), e003800 (2017)

3. Dworkin, M. J.: Sha-3 standard: Permutation-based hash and extendable-output functions. Federal Information Processing Standards (NIST FIPS)-202 (2015)

4. Gallagher, P.: Digital signature standard (dss). Federal Information Processing Stan-dards Publications, volume FIPS pp. 186-3 (2013)

5. Nakamoto, S.: Bitcoin: A peer-to-peer electronic cash system (2019)

6. Schneier, B.: The nsa is breaking most encryption on the internet. blog post, septem-ber 2013

7. Stevens, M., Bursztein, E., Karpman, P., Albertini, A., Markov, Y., Bianco, A. P., Baisse, C.: Announcing the first shal collision. Google Security Blog (2017)

8. Zyskind, G., Nathan, O., et al.: Decentralizing privacy: Using blockchain to protect personal data. In: 2015 IEEE Security and Privacy Workshops. pp. 180-184. IEEE (2015)

The invention claimed is:

1. A method for securing data using blockchain technology, realized in a system comprising a central server and two or more subsystems, each of them controlled by a dedicated sub-server, wherein each of the two or more subsystems comprises:
   a first blockchain database for storing information data, especially data of biotechnological laboratories, wherein transactions in the first blockchain database are committed according to blockchain rules, including treating a first specific piece of information as a transaction, creating a digital signature of the transaction by an author of said first specific piece of information with the author's digital key, combining transactions into a first new block, encrypting the first new block with a hash of a previous block in the first database and storing the first new block in the first database,
   a second blockchain database for storing access data, including digital keys of users having access to the first database and information about permissions to read data from or write data to the first database by each such user associated with the digital key of this user, in which second database information is stored according to blockchain rules, including treating a second specific piece of information as a transaction, creating a digital signature of the transaction by the author of said second specific piece of information with the author's digital key, combining transactions into a second new block, encrypting the second new block with a hash of the previous block in the second database and storing the second new block in the second database,
   wherein every authorized user having access to the first database is able to allow another user to read from the first database the data authored by said authorized user by adding the digital key of said another user with information of corresponding permission to said second database,
   wherein every authorized user having access to the first database is able to forbid another user to read from the first database the data authored by said authorized user by adding the digital key of said another user with information of corresponding permission to said second database,
   wherein every authorized user having access to the first database is able to revoke from another user previously granted rights regarding access to data in the first database authored by said authorized user,
   wherein said method for securing data includes verification by the central server of compatibility and immutability of the first and second blockchain databases in said two or more subsystems by:
      collecting hashes and optionally timestamps from the first and second blockchain databases in each of said two or more subsystems,
      exchanging new transactions between the central server and the sub-servers exchange and independently verifying compatibility of hashes, with the use of the private key of the sub-server to avoid fake hashes;
   wherein the central server periodically communicates with the first or second blockchain databases in each of the two or more subsystems, each of the two or more subsystems controlled by a dedicated sub-server, the first or second blockchain databases being periodically verified by the central server; and
   wherein the central server is a laboratory server or a central computer without internet access.

2. The method according to claim 1, wherein a SHA-3 is used as a hash function for calculation of block hashes in the first blockchain database and/or the second blockchain database.

3. The method according to claim 1, wherein the RSA algorithm with a key size of 4096 bits is used for creating a digital signature of the transaction with its author's digital key in the first blockchain database and/or the second blockchain database.

4. The method according to claim 1, wherein the system additionally comprises a timestamp server and the timestamp server provides timestamps to the first blockchain database and/or the second blockchain database, including to transactions and/or blocks in the first blockchain database and/or the second blockchain database.

5. The method according to claim 1, wherein the second database comprises a summary block, containing hashes of the K preceding blocks and the hash of the latest summary block, wherein summary block contains updated information of user privileges.

6. The method according to claim 5, wherein the central server supervises the summary blocks.

7. The method according to claim 1, wherein said first blockchain database and said second blockchain database is one and the same blockchain database, for storing both the information data and the access data, including digital keys of users having access to the first database and information about permissions to read data from or write data to the first database by each such user associated with the digital key of this user.

8. The method according to claim 1, wherein the data stored in the first database relate to donor registration for transplants, biostorage or clinical trials.

9. A system for securing data comprising a central server and two or more subsystems, each of them controlled by a dedicated sub-server, wherein each of the two or more subsystems comprises a first blockchain database for storing information data and a second blockchain database for storing access data, including digital keys of users having access to the first database and information about permissions to read data from or write data to the first database by each such user associated with the digital key of this user, said system configured and programmed for carrying out the method according to claim 1.

* * * * *